United States Patent
Champagne, Jr. et al.

(10) Patent No.: US 10,501,827 B2
(45) Date of Patent: Dec. 10, 2019

(54) METHOD TO JOIN DISSIMILAR MATERIALS BY THE COLD SPRAY PROCESS

(71) Applicant: U.S. Army Research Laboratory ATTN:RDRL-LOC-I, Adelphi, MD (US)

(72) Inventors: Victor K. Champagne, Jr., Dudley, MA (US); Victor K. Champagne, III, Dudley, MA (US)

(73) Assignee: The United Statesd of America as represented by the Secretary of the Army, Washington, DC (US)

( * ) Notice: Subject to any disclaimer, the term of this patent is extended or adjusted under 35 U.S.C. 154(b) by 1141 days.

(21) Appl. No.: 14/499,282

(22) Filed: Sep. 29, 2014

(65) Prior Publication Data
US 2016/0089750 A1    Mar. 31, 2016

(51) Int. Cl.
*B23K 31/00*      (2006.01)
*C22C 21/08*      (2006.01)
(Continued)

(52) U.S. Cl.
CPC .............. *C22C 21/08* (2013.01); *B23K 28/02* (2013.01); *B23K 35/36* (2013.01); *C04B 37/026* (2013.01);
(Continued)

(58) Field of Classification Search
CPC .... B23K 31/02; B23K 20/22; B23K 20/2275; B23K 20/2333; B23K 20/12; B23K 2203/22; B23K 2203/08; B23K 2203/24; B23K 2203/10; B23K 2203/02; B23K 2203/20; B23K 2203/14; B23K 2203/15; B23K 2203/42; B23K 2203/52;
(Continued)

(56) References Cited

U.S. PATENT DOCUMENTS 3,819,311 A * 6/1974 Horn .................... B22F 3/18
                                                425/363
3,966,454 A * 6/1976 Ito ......................... B22F 1/0088
                                                75/345
(Continued)

FOREIGN PATENT DOCUMENTS

WO     WO-2014082695 A1 *  6/2014  ............. C23C 24/04

OTHER PUBLICATIONS

Kosarev VF, Klinkov SV, Alkhimov AP, Papyrin AN. On Some Aspects of Gas Dynamic Principles of Cold Spray Process. Journal of Thermal Spray Technology, 2003, vol. 12(2), p. 265.*
(Continued)

*Primary Examiner* — Kiley S Stoner
(74) *Attorney, Agent, or Firm* — Christos S. Kynakou (57) ABSTRACT

A process for joining dissimilar materials. The process includes providing a first component made from a first material and a second component made from a second material. The process also includes cold spraying a bead of the second material onto the first component and joining the second component to the bead on the first component such that a weldment is formed from the first component and the second component. In some instances, joining of the second component to the bead on the first component is performed by fusion welding the bead and the second component together.

17 Claims, 6 Drawing Sheets

(51) Int. Cl.

| | | |
|---|---|---|
| C22C 23/04 | (2006.01) | |
| B23K 35/36 | (2006.01) | |
| B23K 28/02 | (2014.01) | |
| C04B 37/02 | (2006.01) | |
| B23K 103/02 | (2006.01) | |
| B23K 103/12 | (2006.01) | |
| B23K 103/14 | (2006.01) | |
| B23K 103/08 | (2006.01) | |
| B23K 103/18 | (2006.01) | |
| B23K 103/20 | (2006.01) | |
| B23K 103/00 | (2006.01) | |
| B23K 103/10 | (2006.01) | |

(52) U.S. Cl.
CPC .......... *C22C 23/04* (2013.01); *B23K 2103/02* (2018.08); *B23K 2103/10* (2018.08); *B23K 2103/12* (2018.08); *B23K 2103/14* (2018.08); *B23K 2103/15* (2018.08); *B23K 2103/18* (2018.08); *B23K 2103/20* (2018.08); *B23K 2103/42* (2018.08); *B23K 2103/52* (2018.08)

(58) Field of Classification Search
CPC ........................ B23K 2203/18; B23K 2203/12; B23K 35/36; B23K 35/365; B23K 2201/34; C22C 23/04; C22C 21/08
See application file for complete search history.

(56) References Cited

U.S. PATENT DOCUMENTS

| | | | |
|---|---|---|---|
| 4,274,864 A * | 6/1981 | Bernhardt | B22F 9/082 148/513 |
| 5,049,211 A * | 9/1991 | Jones | C22C 21/00 148/437 |
| 6,938,668 B2 | 9/2005 | Whicher et al. | |
| 8,187,720 B2 | 5/2012 | Choi et al. | |
| 8,580,350 B2 | 11/2013 | Choi et al. | |
| 8,584,732 B1 | 11/2013 | Trexler et al. | |
| 9,482,105 B1 | 11/2016 | Gorokhovsky et al. | |
| 9,682,445 B1 * | 6/2017 | Chou | B23K 31/02 |
| 10,099,322 B2 | 10/2018 | Widener et al. | |
| 10,281,227 B1 | 5/2019 | Champagne et al. | |
| 2002/0066770 A1 * | 6/2002 | James | B22F 5/04 228/119 |
| 2003/0039856 A1 * | 2/2003 | Gillispie | B23K 1/0012 428/650 |
| 2005/0194036 A1 * | 9/2005 | Basol | H01L 31/0322 136/252 |
| 2005/0242158 A1 * | 11/2005 | Bolser | B23K 20/1265 228/112.1 |
| 2007/0215677 A1 * | 9/2007 | Floyd | B23K 1/008 228/122.1 |
| 2008/0035615 A1 * | 2/2008 | Li | B23K 26/32 219/121.63 |
| 2008/0047222 A1 * | 2/2008 | Barnes | B23K 20/1225 52/693 |
| 2008/0145688 A1 * | 6/2008 | Miller | B23K 31/02 428/594 |
| 2008/0160332 A1 * | 7/2008 | Dighe | B23K 3/0607 428/554 |
| 2008/0166585 A1 * | 7/2008 | Allen | B23K 9/0026 428/615 |
| 2008/0216602 A1 * | 9/2008 | Zimmermann | B22F 7/08 75/245 |
| 2009/0092823 A1 * | 4/2009 | Webb | B23K 1/0008 428/323 |
| 2010/0089976 A1 * | 4/2010 | Szymanski | B23K 20/122 228/113 |
| 2010/0143700 A1 | 6/2010 | Champagne et al. | |
| 2010/0143746 A1 * | 6/2010 | Song | C23C 24/04 428/636 |
| 2010/0170937 A1 * | 7/2010 | Calla | C23C 24/04 228/165 |
| 2010/0226778 A1 * | 9/2010 | Wallis | B21D 26/055 416/223 A |
| 2013/0029177 A1 * | 1/2013 | Song | C23C 24/04 428/642 |
| 2013/0081748 A1 * | 4/2013 | Miller | B05D 1/02 156/60 |
| 2013/0089726 A1 * | 4/2013 | Anand | C23C 24/04 428/312.8 |
| 2013/0156586 A1 * | 6/2013 | Richter | B23K 15/0006 416/213 R |
| 2013/0186304 A1 * | 7/2013 | Pabla | C23C 24/04 106/287.19 |
| 2014/0099494 A1 | 4/2014 | Choi et al. | |
| 2014/0115854 A1 | 5/2014 | Widener et al. | |
| 2014/0117109 A1 | 5/2014 | Champagne et al. | |
| 2014/0339093 A1 * | 11/2014 | Lancaster-Larocque | C25D 11/022 205/121 |
| 2015/0217395 A1 * | 8/2015 | Spinella | B23K 11/11 219/86.22 |
| 2015/0233257 A1 * | 8/2015 | Fujiya | F01D 5/288 416/224 |
| 2015/0299863 A1 | 10/2015 | Champagne et al. | |
| 2015/0314403 A1 * | 11/2015 | Bruck | B23K 37/0452 219/76.14 |
| 2016/0030632 A1 * | 2/2016 | Schleicher | C23C 24/04 428/660 |
| 2016/0053380 A1 * | 2/2016 | Klecka | C23C 24/04 427/446 |
| 2016/0168721 A1 | 6/2016 | Nardi et al. | |
| 2016/0339521 A1 * | 11/2016 | Dardas | B33Y 10/00 |
| 2017/0156869 A1 * | 6/2017 | Uzuyem | A61F 2/3094 |
| 2017/0253977 A1 | 9/2017 | Champagne et al. | |

OTHER PUBLICATIONS

S.M. Bernard, J.M. Samet, A. Grambsch, K.L. Ebi, and I. Romieu: Environ. Health Perspect., 2001, vol. 109, pp. 199-209.*

Zhao, L.M. Zhang, Z.D. Effect of Zn alloy interlayer on interface microstructure and strength of diffusion-bonded Mg-Al joints; Scripta Materialia 58 (2008) 283- 286.

P. Liu, Y.J. Li, H.R. Geng, J. Wang, Mater. Lett 59 (2005) 2001.

Kostka, A. Coelho, R S. Santos, J. Pyzalla, A.R. Microstructure of friction stir welded aluminium alloy to magnesium alloy; Accepted manuscript in Scripta Materialia 2009.

Ben-Artzy, A. Sternb, A. Frage, N. Shribman, V. Sadat, 0. Wave formation mechanism in magnetic pulse welding; International Journal of Impact Engineering 37 (2010) 397-404.

Liming Liu. Hongyang Wang. Microstructure and properties analysis of laser welding and laser weld bonding mg to al joints; The Minerals, Metals & Materials Society and ASM International 2010;Peng Liu, Yajiang Li, Haoran Geng, Juan Wang.

Rattana Borrisutthekul, Yukio Miyashita, Yoshiharu Mutoh. Dissimilar material laser welding between magnesium alloy AZ31B and aluminum alloy A5052-O; Science and Technology of Advanced Materials 6 (2005) 199-204.

Peng Liu, Yajiang Li, Haoran Geng, Juan Wang. Microstructure characteristics in Tig welded joint of Mg/Al dissimilar materials; Materials Letters 61 (2007)1288-1291.

A. Ben-Artzy, A. Munitz, G. Kohn, B. Bronfin, A. Shtechman. TMS Meeting 2002, Magnesium Technology, 2002, p. 295.

0. Tomiharu, J. Light. Metal. Weld. Const 42 (2004) 2.

Jing Shang, Kehong Wang, Qi Zhou, Deku Zhang, Jun Huang, Guangle Li. Microstructure characteristics and mechanical properties of cold metal transfer welding Mg/Al dissimilar metals; Materials and Design (2011).

A.C. Somasekharan, L.E. Murr. Microstructures in friction-stir welded dissimilar magnesium alloys and magnesium alloys to 6061-T6 aluminum alloy; Materials Characterization 52 (2004) 49-64.

C. Tomaa, E. Cicalaa, P. Sallamandb, D. Greveyb. CMT Joining of aluminum magnesium alloys in a statistical experiment; Metal 2012, 23.—25. 5. 2012, Brno, Czech Republic, EU.

(56) References Cited

OTHER PUBLICATIONS

Papyrin A. Cold Spray Technology. Advanced Materials & Processes, Sep. 2001, p. 49.

Van Steenkiste TH. Kinetic Spray Coatings. Surface and Coatings Technology, 1999, 111, p. 62.

Stoltenhoff T, Kreve H, Richter H. An Analysis of the Cold Spray Process and Its Coatings. Journal of Thermal Spray Technology, 2002, vol. 11(4), p. 542.

Buxton A, Norris I, Dissimilar materials novel solutions to joining the unjoinable. TWI Bulletin, Jan.-Feb. 2008.

Gould J., Automakers Look to Solid State Welding of Dissimilar Metals. Fastening/Joining/Assembly Supplement, Sep. 13, 2004.

Grujicic M, Zhao CL, Tong C, DeRosset WS, Helfritch D. Analysis of the Impact Velocity of Powder Particles in the Cold-Gas Dynamic-Spray Process. Materials Science and Engineering A368, 2004, p. 222.

Grujicic M, Saylor JR, Beasley DE, Derosset WS, Helfritch D. Computational Analysis of the Interfacial Bonding between Feed-Powder Particles and the Substrate in the Cold-Gas Dynamic-Spray Process. Applied Surface Science, vol. 219, 2003, p. 211.

Dykhuizen RC, Smith MF, "Gas Dynamic Principles of Cold Spray" Journal of Thermal Spray Technology, 199, vol. 7 (2), p. 205-212.

Bernard et al. "The Potential Impacts of Climate Variability and Change on Air Pollution-Related Health Effects in the United States" Environmental Health Perspectives • vol. 109 | Supplement 2 | May 2001.

M.P. Walsh: Plat. Met. Rev., 2000, vol. 44, pp. 22-30.

J.M. Schreiber et al./Journal of Alloys and Compounds 617 (2014) 135-139.

Champagne III, Victor & K. West, Michael & Rokni, Reza & Curtis, Todd & Champagne Jr, Victor & Mcnally, Baillie. (2015). Joining of Cast ZE41A Mg to Wrought 6061 Al by the Cold Spray Process and Friction Stir Welding. Journal of Thermal Spray Technology. 25.

* cited by examiner

METHOD TO JOIN DISSIMILAR MATERIALS BY THE COLD SPRAY PROCESS

GOVERNMENT INTEREST

The invention described herein may be manufactured, used, and licensed by or for the United States Government.

FIELD OF USE

The present invention relates to a process for joining dissimilar materials, and in particular to a process for joining dissimilar materials using cold spraying.

BACKGROUND

Joining of materials using a welding process is known. In addition, joining of dissimilar materials is also known. However, heretofore known processes for joining dissimilar materials, e.g. diffusion bonding, explosive bonding, friction welding, etc., have required costly fixtures and/or equipment to produce a suitable joint between the materials. In addition, conventional welding processes for joining dissimilar materials typically result in less than desirable joints due to interdiffusion between the dissimilar materials, excessive heat and/or melting occurring in at least one of the materials, brittle intermetallics and/or porosity at the interface between the dissimilar materials being joined, and the like. Therefore, an improved joining process for joining dissimilar materials would be desirable.

SUMMARY

A process for joining dissimilar materials is provided. The process includes providing a first component made from a first material and a second component made from a second material. It is appreciated that the first material and the second material are dissimilar materials. For the purposes of the present invention, the term "dissimilar materials" refers to at least two materials that when joined by a conventional welding technique such as shielded metal arc welding, gas tungsten arc welding, gas metal arc welding, and the like produces weld joints that have an unacceptable strength and/or ductility. In many of such cases, interdiffusion of one material into the other material leads to intermetallic phases being formed at the interface between the two materials, within the heat affected zone of at least one of the materials, and the like.

The process also includes cold spraying a bead of the second material onto the first component. In some instances, this is referred to as "buttering" of an edge of the first component such that it is completely covered with the second material. The bead can be in the form of a flange, ledge, etc. joined to and extending from the first component. In addition, the cold spraying can be performed using a hand held and hand maneuvered nozzle, or in the alternative performed using a robotic held and maneuvered nozzle. This is accomplished by staggering the indexing of the robot so that the deposit is built up uniformly and does not create a 'pyramid' shape that is the result of improper indexing of the robot during each iterative pass.

The second component is joined to the bead on the first component such that a weldment is formed from the first component and the second component. In some instances, joining of the second component to the bead on the first component is performed by fusion welding the bead and the second component together. In addition, the weldment of the first component and the second component can include a butt joint between the first component and the second component, or in the alternative a lap joint between the first component and the second component.

In other instances, joining of the second component to the bead on the first component is performed by cold spraying another bead between the original bead applied to the first component and the second component. Similar to above, the weldment of the first component and the second component that is accomplished via cold spraying alone can include a butt joint, or in the alternative a lap joint.

In still other instances, joining of the second component to the bead on the first component can include brazing of the bead and the second component together. Also, such a weldment can include a butt joint, a lap joint, etc.

The first material can be any material known to those skilled in the art such as a ceramic, a polymer, an intermetallic, a magnesium alloy, an iron alloy, a copper alloy, a titanium alloy, and a zinc alloy. In addition, the second material can be one of such materials such that it is not the same material as the first component. For example and for illustrative purposes only, the first material can be a magnesium alloy and the second material can be an aluminum alloy. In the alternative, one of the materials can be a steel alloy and the other material an aluminum alloy, a magnesium alloy, a copper alloy, a titanium alloy, a zinc alloy, etc.

The cold spraying of the bead onto the first component, and an optional cold sprayed bead onto the second component results in an interface that is void of a heat affected zone. In addition, the interface can be void of any intermetallic layer, intermetallic precipitates, etc.

The present invention also discloses and teaches a weldment made from the first component of the first material and the second component of the second material. The first component and the second component have a weld joint therebetween and the weld joint is at least one cold spray bead attached to and forming a joint between the first component and the second component. In addition, the cold spray bead has an adhesion strength to the first component and/or the second component that is larger than an ultimate tensile strength of the first component and/or the second component. The weldment can include a fusion weld bead between a cold spray bead that has been applied to the first component and the second component. In the alternative, the weldment includes a plurality of cold spray beads, or one continuous cold spray bead, between the first and second components.

The post processing of the feedstock powder is required to eliminate adsorbed moisture and to promote metal-to-metal bonding of the accelerating particles during the cold spray process. A degassing operation is performed under high vacuum conditions ($10\_4$ to $10\_6$ torr) and heated between 260-400 degrees Celsius. The 6061 Aluminum powder feedstock powder size is critical to forming a high integrity bond and a dense deposit. Argon was used as the atomization gas at a minimum purity of Grade 4 or 99.99% pure. Non-metallic impurities did not exceed 0.1 wt % for the total moisture and volatiles, loss on ignition. Oxygen, present as $Al_2O_3$, did not exceed 0.8 wt % and were free of agglomerates exceeding 120 µm in size. The particle size was between 20 and 90 um in diameter.

DETAILED DESCRIPTION

The present invention provides a practical method or methods for joining dissimilar materials using the cold spray process. The invention also includes the development of various joint designs and surface preparation methodologies and the incorporation of these into specific sequences of fabrication steps using cold spray as an enabling technology to join dissimilar materials.

The process includes applying a cold spray layer or bead onto a material or component to be joined and the cold spray layer serving as a key element for joining to a separate and dissimilar material. The joining of the dissimilar materials is performed such that adequate structural integrity is demonstrated by the weldment. Also, the joint and/or interface between the bead and one or more components is void of an intermetallic layer since the process is formed or performed well below a melting temperature of the components and/or the cold spray material. Furthermore, an undesirable heat affected zone (HAZ) and cold spray particle oxidation is avoided, as well as harmful tensile stresses formed during thermal contraction and solidification that occurs with traditional welding techniques. As such, the use of the cold spray technology avoids undesirable metallurgical transformations, including grain growth and oxidation that can have detrimental effects on bond strength and the creation of porosity.

The use of the inventive process affords for joining of dissimilar materials for applications in aerospace, munitions, armored vehicles that require joining of dissimilar materials, including those associated with advanced armor. In addition, reduction in weight and improvement of performance are provided with the disclosed process.

The process includes providing a first component made from a first material and a second component made from a second material. The first material and the second material are dissimilar materials and as such welding the two components together using a traditional welding process results in a joint therebetween that has undesirable and insufficient strength and/or ductility. A bead or layer is cold sprayed onto the first component and then the second component is joined to the bead or layer that has been cold sprayed onto the first component. In some instances, the cold spray bead has a chemical composition that is the same as the second material. In the alternative, the chemical composition of the cold spray bead can be similar to the second component. The term "similar" refers to a composition that may not be exactly the same as the second material but has similar chemical, physical, and/or mechanical properties. For example and for illustrative purposes only, if the second material is a 6061 aluminum alloy, then the cold spray bead can have a chemical composition that is essentially the same as the 6061 aluminum alloy, or in the alternative can be equivalent to other 6000 series aluminum alloys.

In some instances, an edge, flange, surface, etc. of the first component is applied with a cold sprayed layer of sufficient thickness such that the second component can be joined to the layer using a traditional fusion welding process and yet not affect the interface between the first component and the cold sprayed layer thereon. In this manner, a heat affected zone having deleterious intermetallics, porosity, and the like is avoided between the first material and the second material.

In other instances, the joining of the first component to the second component is performed exclusively by applying a plurality of cold spray beads or layers, or in the alternative a single continuous cold spray bead, between the original cold spray bead on the first component and the second component. In still other instances, the second component can be joined to the bead or layer that is applied to the first component using brazing, soldering, etc.

Figure 1:
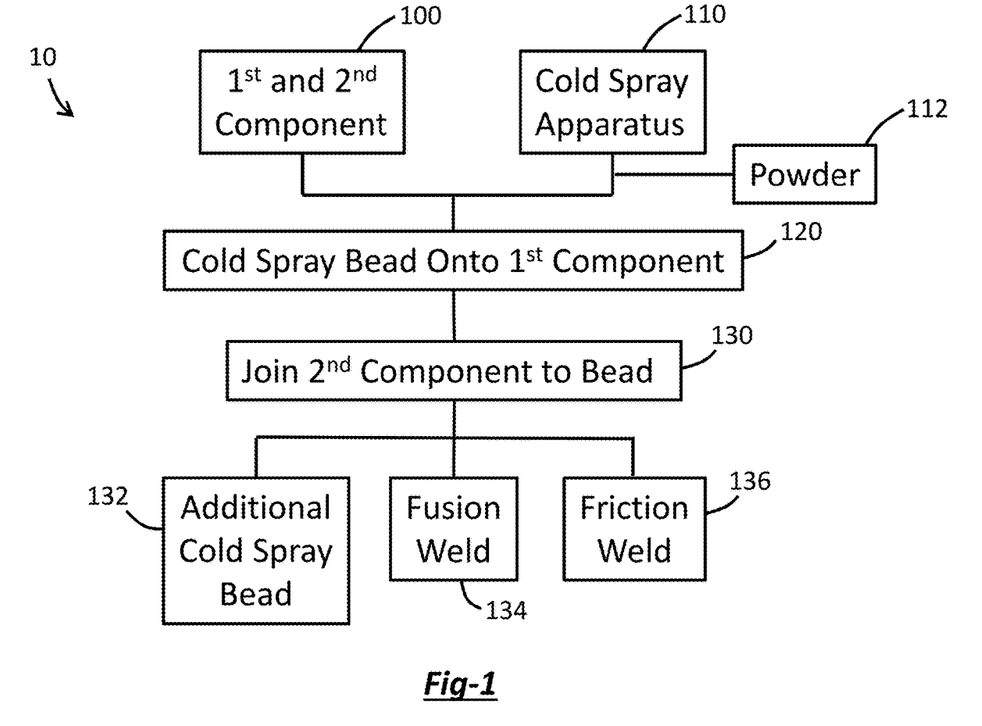
FIG. 1 is a schematic flowchart of a process according to an embodiment of the present invention.

Turning now to FIG. 1, a process according to an embodiment of the present invention is shown generally at reference numeral 10. The process includes providing a first component and a second component at step 100 and also providing a cold spray apparatus at step 110. Powder is provided at step 112 and a cold spray bead or layer is applied onto the first component at step 120. At step 130, the second component is joined to the bead on the first component. The joining of the second component to the bead on the first component can be performed by providing an additional cold spray bead at step 132, using a fusion weld at step 134, or using a friction weld at step 136.

Figure 2:
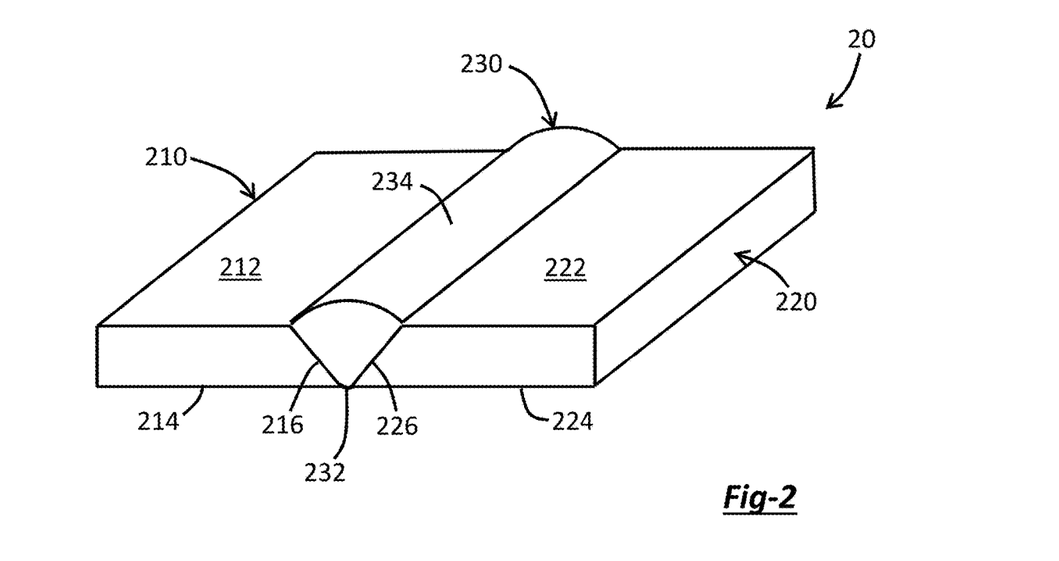
FIG. 2 is a schematic illustration of a weldment containing a butt joint between dissimilar materials according to an embodiment of the present invention.

FIG. 2 provides a schematic illustration of a weldment according to an embodiment of the present invention at reference numeral 20. The weldment 20 includes a first component 210 made from a first material and a second component 220 made from a second material. The first component 210 has a top surface 212 and a bottom surface 214. In addition, the first component 210 has a butt joint edge 216. Similarly, the second component 220 has a top surface 222, a bottom surface 224, and a butt joint edge 226.

In between the first component 210 and the second component 220 is a cold spray joint 230 that has a root 232 and a face 234. The cold spray joint 230 can be a plurality of cold spray beads or, in the alternative, a single cold spray bead. The cold spray bead 230 can be made or have a chemical composition similar to the first material of the first component 210 or the second material of the second component 220. In the alternative, the cold spray bead 230 has a chemical composition that is not considered similar to the first material or the second material, but does afford for suitable and desired joining between the first component 210 and the second component 220.

Figures 3, 4, 5:
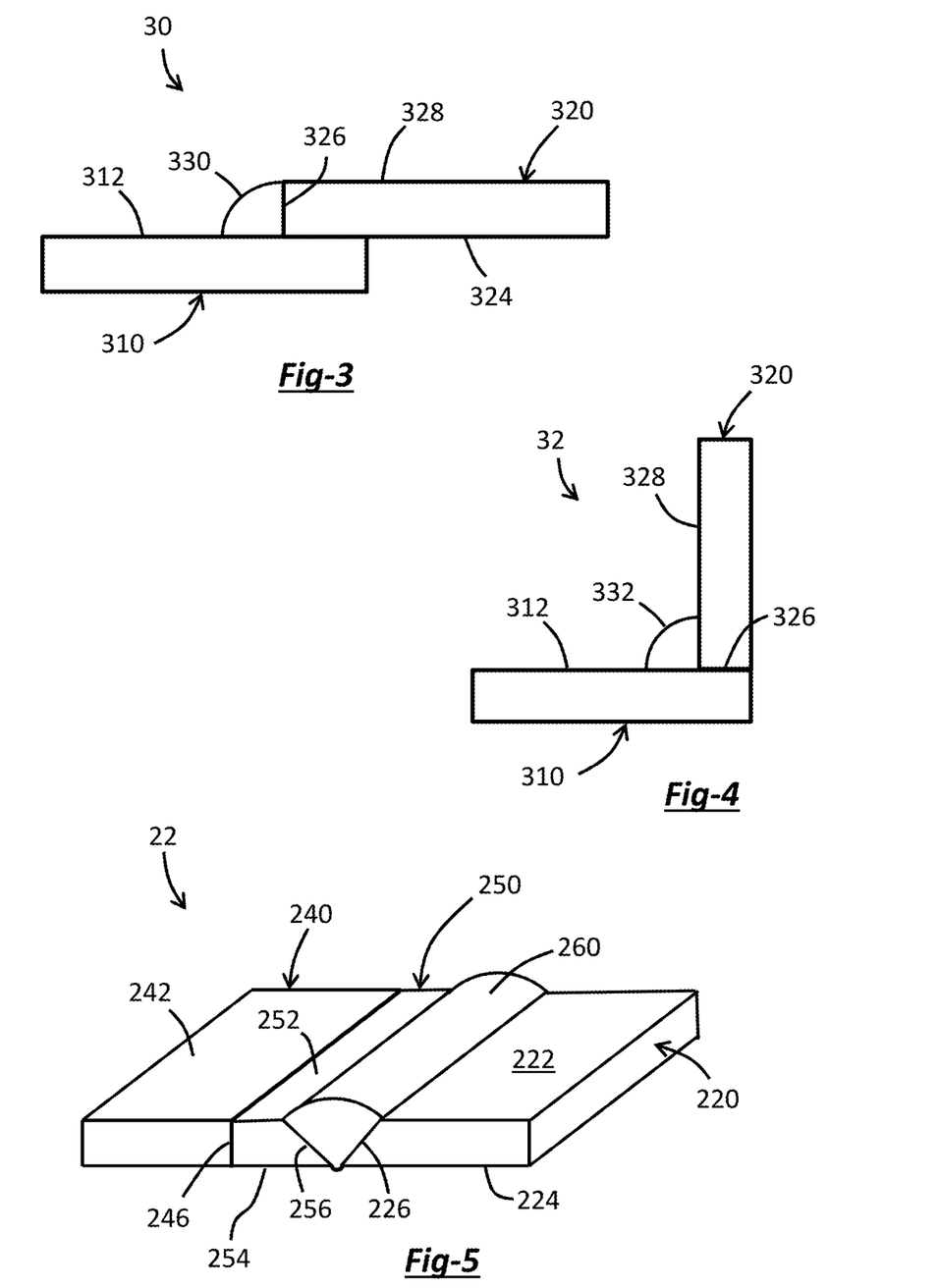
FIG. 3 is a schematic illustration of a weldment containing a lap joint between dissimilar materials according to an embodiment of the present invention.
FIG. 4 is a schematic illustration of a weldment containing a lap joint according to an embodiment of the present invention.
FIG. 5 is a schematic illustration of a weldment containing a butt joint according to an embodiment of the present invention.

Referring to FIG. 3, a weldment 30 is shown in which a first component 310 having an upper face or surface 312 is joined to a second component 320 having a bottom face or surface 324. The joining of the first component 310 to the second component 320 is performed via a lap joint using a cold spray bead 330 between an end surface 326 of the second component 320 and the top surface 312 of the first component 310. It is appreciated that the cold spray bead 330 can be a single cold spray bead, or in the alternative can be a plurality of cold spray beads.

FIG. 4 illustrates another lap joint between the first component 310 and the second component 320 in which a cold spray bead 332 provides a weldment by applying the cold spray bead to the surface 312 of the first component 310 and a surface 328 of the second component 320.

Referring now to FIG. 5, an inventive joint design is shown at reference numeral 22. The weldment 22 includes a first component 220 and a second component 240. The second component 240 has a top surface 242 and an edge or end surface 246. In addition, a cold spray bead 250 which has a top surface 252 and a bottom surface 254 has been applied to the second component 240. It is appreciated that the cold spray bead 250 has a chemical composition that is similar to the first component 220 and can be single bead or a plurality of beads. After applying the cold spray bead 250, a traditional fusion weld bead 260 is applied between the cold spray bead 250 and the first component 220. The fusion weld bead 260 is applied between a butt joint edge 256 of the cold spray bead or layer 250 and a butt joint edge 226 of the first component 220. It is appreciated that the cold spray bead 250 applied to the second component 240 affords for an interface therebetween that is void of a fusion zone and a HAZ. As such, the interface is void of intermetallics and/or porosity that can occur for the joining of dissimilar materials.

Figures 6, 7:
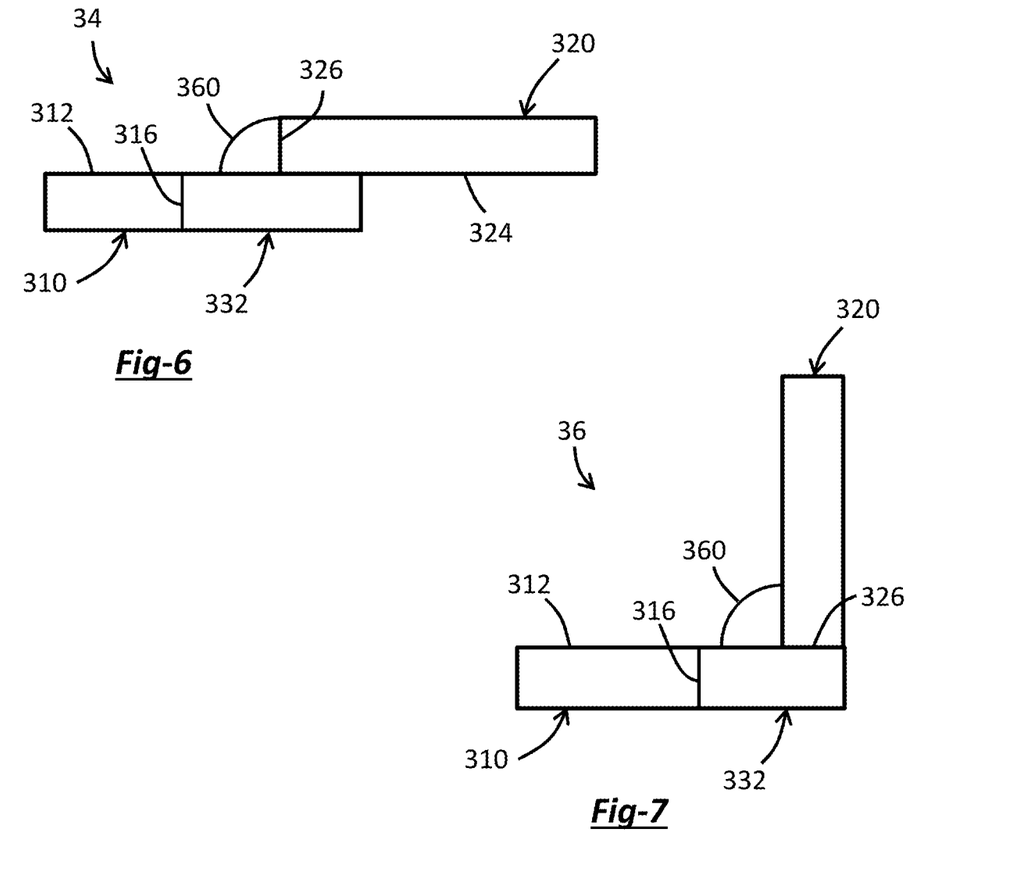
FIG. 6 is a schematic illustration of a weldment containing a lap joint according to an embodiment of the present invention.
FIG. 7 is a schematic illustration of a weldment containing a lap joint according to an embodiment of the present invention.

Turning now to FIG. 6, a lap joint as illustrated in FIG. 3 is shown except for the first component 310 has a cold spray bead or layer 332 applied thereto and the weld bead 360 is a traditional fusion weld bead that has been applied between the second component 320 and the cold spray bead or layer 332. Similar to the discussion above with respect to FIG. 5, an interface 316 between the first component 310 and the cold spray bead 332 is void of a fusion zone and a heat affected zone.

FIG. 7 illustrates a lap joint similar to the joint shown in FIG. 4, but again the cold spray bead or layer 332 has been applied to the first component 310 and as such a traditional fusion weld bead has been applied between the second component 320 and the cold spray bead 332. Thus similar to the butt joint shown in FIG. 5, applying a cold spray bead to the first component 310 affords for the use of traditional welding techniques to join dissimilar materials.

Figure 8:
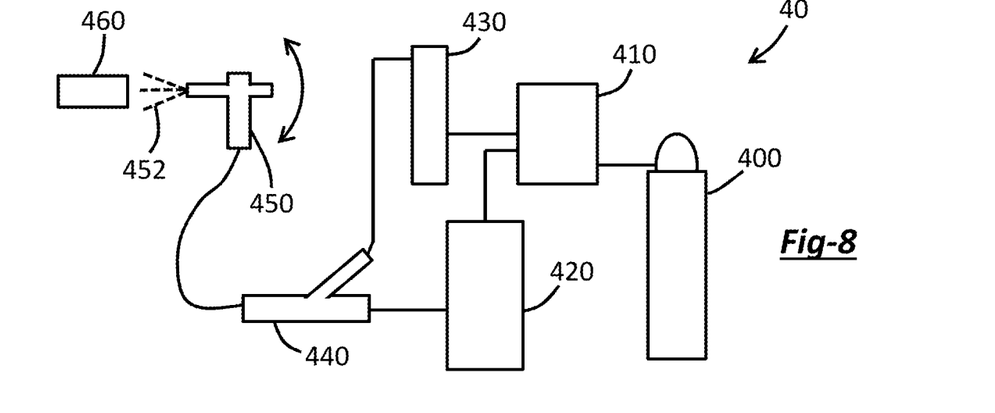
FIG. 8 is a schematic illustration of an apparatus according to an embodiment of the present invention.

FIG. 8 shows a schematic illustration of a cold spray apparatus according to an embodiment of the present invention at reference numeral 40. The apparatus at reference numeral 40 includes a gas supply 400 and a gas control panel 410. The gas supply can be any type of gas used for cold spray known to those skilled in the art, illustratively including helium, nitrogen, argon, a combination of the two, and the like. Also included are a powder feeder 420 and a gas heater 430. Gas from the gas supply 400 passes through the gas control panel 410 and through the heater 430 before entering a gas-powder mixer 440. It is appreciated that gas from the gas supply 400 can also pass through the powder feeder 420 in order to assist powder flow from the powder feeder 420 to the gas-powder mixer 440. Thereafter, a gas-powder mixture passes from the mixer 440 to a cold spray gun or nozzle 450. The gun or nozzle 450 then applies powder from the powder feeder 420 in a stream or spray 452 onto a component 460. The nozzle or gun 450 can be rotated as illustrated by the double-headed arrow in the figure. In the alternative, the component 460 and/or gun 450 can be rotated such that a desired bead or layer is applied to the component.

In order to better teach the invention but not limit its scope in any way, one or more examples are provided below.

Samples of cast ZE41A-T5 magnesium and wrought 6061-T6 aluminum were joined to each other using the inventive process and apparatus disclosed herein. An exemplary compositional range (in weight percent) for a cast ZE41A-T5 component is 0.75-1.75 cerium, 0.10 maximum (max) copper, 0.15 max manganese, ≤0.010 nickel, 3.5-5.0 zinc, 0.4-1.0 zirconium, with the remainder being magnesium and incidental melting impurities. Also, an exemplary compositional range for a 6061 aluminum component is 0.04-0.35 chromium, 0.15-0.40 copper, 0.70 iron, 0.8-1.2 magnesium, ≤0.15 manganese, 0.4-0.8 silicon, 0.25 zinc with the remainder being aluminum and incidental melting impurities.

Surfaces that were joined were prepared via abrasive blasting followed by solvent rinsing. In some instances, virgin abrasive was used to minimize the embedding of corrosive materials such as iron into the magnesium and/or aluminum substrate. For example, abrasive media in the form of 60 grit aluminum oxide from McMaster-Carr was used and the abrasive media was sprayed using a pressure of 100 psi, a 45 degree angle standoff and a distance between a grit blasting gun and a surface or part being prepared being 4 to 6 inches. The solvent rinse was either methanol or ethanol.

Figure 9:
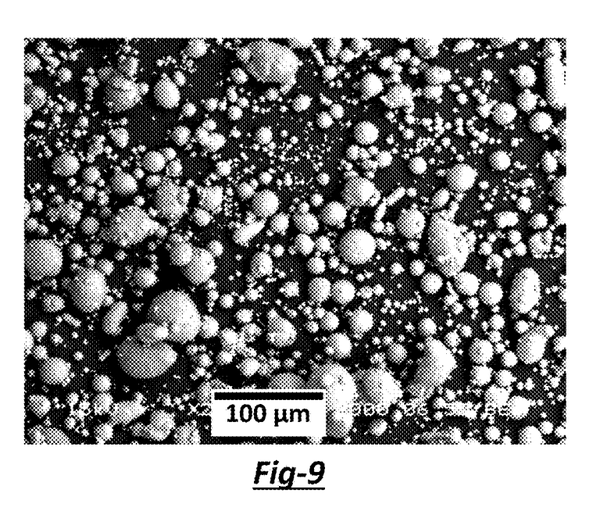
FIG. 9 is a scanning electron microscopy image of aluminum alloy powder used during a cold spray process according to an embodiment of the present invention.

Cold spray process parameters for joining the ZE41A-T5 magnesium to the 6061-T6 aluminum included 6061 Valimet-325 mesh powder sieved by Vortec and a plastic type 33 nozzle for the cold spray apparatus. FIG. 9 illustrates a scanning electron microscopy (SEM) image of such powder. Surfaces of the parts to be joined were prepared/cleaned as described above and the cold spray process used a helium gas at 20 bar pressure. The gas that was passed to the gun 450 was heated to 400° C. In addition, the powder feeder 420 had a rotational speed of 1.3 rpm and used nitrogen gas a flow rate of $4.5^3$/hr. A raster pattern was applied with a standoff distance of 1 inch and a raster speed of 1000 mm/sec. It should be appreciated that the raster pattern was designed and executed in order to ensure that the bead applied to the component had desirable and relatively uniform properties across the width and/or thickness of the bead.

In some instances, the powders used in the cold spray process disclosed herein are annealed prior to use. For example, the powders can be annealed to alter the mechanical properties of individual particles before use, and thereby control or alter the deformation of the particles upon contact/ impact with a surface. In addition, the powders can be annealed in a reducing atmosphere in order to reduce or remove at least a portion of oxide scale that is present on the surface of the particles. Finally, the shape of the powder particles can be altered prior to their use in the cold spray process in order to afford improved cold spray bead properties. In some instances, the shape of the particles is spherical. However, in other instances, particles that are "potato" shaped, i.e. having an ellipsoid shape, are used in order to provide improved cold spray bead properties. It is appreciated that other shapes are included within the scope of the invention.

A number of different weld joints were produced such as those illustrated in FIG. 4 and FIG. 5. In addition, samples were prepared for triple lug shear strength testing as described below.

The samples for triple lug shear strength testing demonstrated the strength of cold spray "weld" 6061 aluminum cold sprayed onto the ZE41A-T5 magnesium and the procedure is described in military specification MIL-J-24445A. In essence, a weld bead or layer with a thickness greater than 0.125 inch was deposited onto a ZE41A-T5 magnesium substrate using the cold spray process and three rectangular-shaped lugs were machined from the deposited 6061-aluminum cold spray material. Thereafter, the lugs were sheared from the test specimen using a compressive load frame setup known to those skilled in the art. It is appreciated that only one lug is sheared from the specimen at a given time and the failure stress is reported based on the load failure and the surface area of the lug. Control specimens milled from single pieces of cast ZE41A-T5 magnesium were included in the matrix to establish a baseline for comparison.

Figure 10:
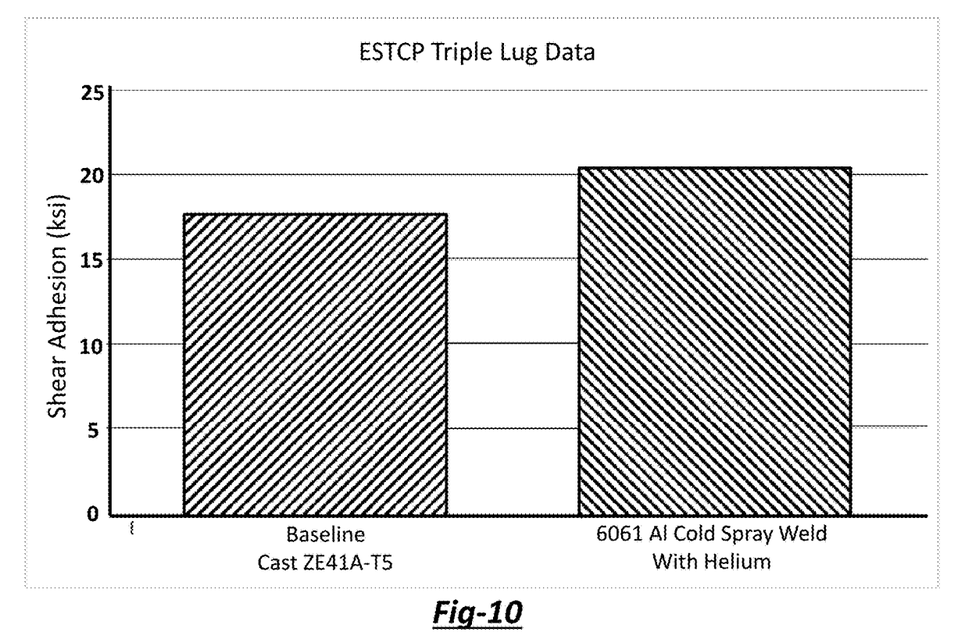
FIG. 10 is a graphical plot of shear adhesion strength for a baseline substrate and lugs welded to the baseline substrate according to an embodiment of the present invention.

The results of the triple lug shear test are illustrated in FIG. 10. As shown in the figure, the 6061 aluminum cold spray welds show very high adhesion strength on the magnesium cast alloy substrate with the average adhesive strength for the 6061 aluminum cold sprayed using helium gas exceeding the average strength of the baseline ZE41A-T5 magnesium samples. In addition, the 6061 aluminum cold spray lugs on the ZE41A-T5 failed or broke off by fracturing within the ZE41A-T5 magnesium substrate and not at the 6061 aluminum-magnesium interface. Therefore, this provides additional proof that a structurally sound weld was provided and is possible between ZE41A-T5 cast magnesium and 6061 aluminum.

Figure 11:
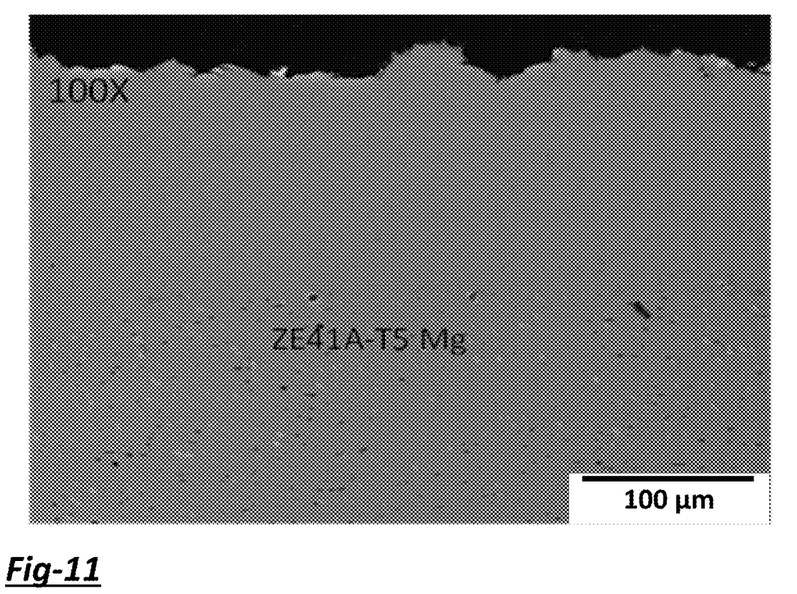
FIG. 11 is a scanning electron microscopy image of an as polished cross section for a cold spray bead on a cast magnesium alloy.
Figure 12:
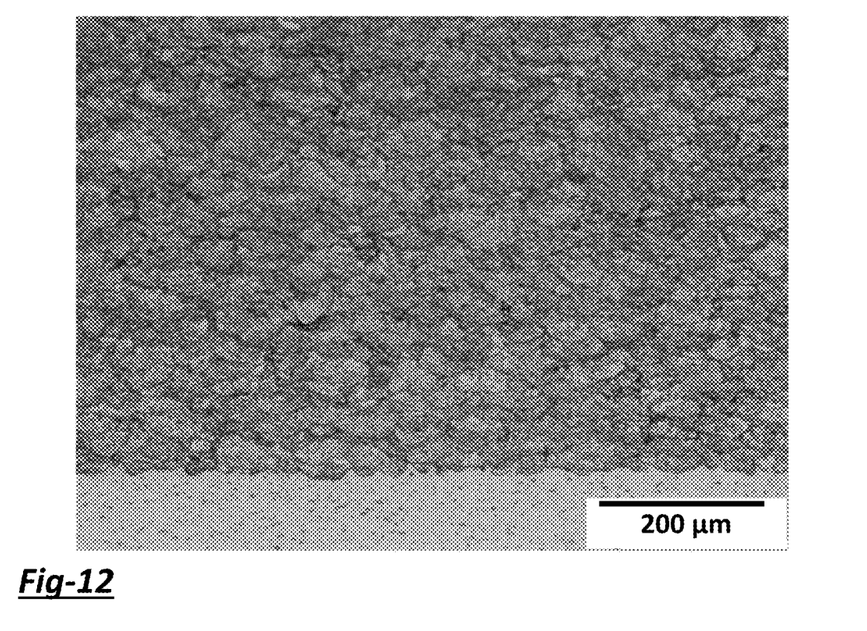
FIG. 12 is an optical microscopy micrograph of an etched microstructure of a 6061 aluminum cold spray bead on a cast magnesium alloy.

Turning now to FIGS. 11 and 12, microstructural analysis of the ZE41A-T5 magnesium and 6061 aluminum welded joint is shown. Cross sections of a welded joint were obtained and polished according to accepted procedures within the art. As shown in both FIGS. 11 and 12, a heat affected zone is not present, nor is there any presence of intermetallics at the weld/substrate interface. It is appreciated that this is expected since the cold spray process is accomplished below any phase transformation temperatures and well below the melting point of both materials being joined. Finally, FIGS. 11 and 12 show that the interface and the weld bead/layer are free from porosity and defects often associated with conventional welds.

Stress analysis of ZE41A-T5 magnesium-6061 aluminum welds was also conducted using an x-ray diffraction (XRD) residual stress analysis. In particular, an XRD sin 2Ψ residual stress analysis technique provided a quantitative method to calculate the residual stress from strain on the deposited 6061 aluminum cold spray material. It is appreciated that the sin 2Ψ residual stress analysis compares the 2θ location of diffracted planes over a series of scans with different surface angles of inclination relative to the x-ray source/substrate surface. Strain present in the 6061 aluminum cold spray material is determined from the change in the d-spacing as a function of the angle of inclination (Ψ), which is the angle between the normal to the sample surface and the bisector of the angle between the incident and reflected x-ray beam. The residual stress is calculated from the slope of the plot of interatomic spacing as a function of sin 2Ψ and residual stress can be calculated from the following equation:

$$\sigma_\phi = \left(\frac{E_{hkl}}{1+\nu}\right)_{(hkl)} \frac{1}{d_{\phi 0}} \left(\frac{\partial d_{\phi\psi}}{\partial \sin^2 \psi}\right)$$

where $\sigma_\phi$ is the residual coating stress, $E_{hkl}$ and $\nu$ are the elastic modulus and Poisson's ratio, respectively, for the plane of interest, $d_{\phi 0}$ is the equilibrium interatomic spacing for Ψ and equals zero for no sample tilt, and $$\frac{\partial d_{\phi\psi}}{\partial \sin^2 \psi}$$

is the slope of interatomic spacing versus $\sin^2$ Ψ.

Figure 13:
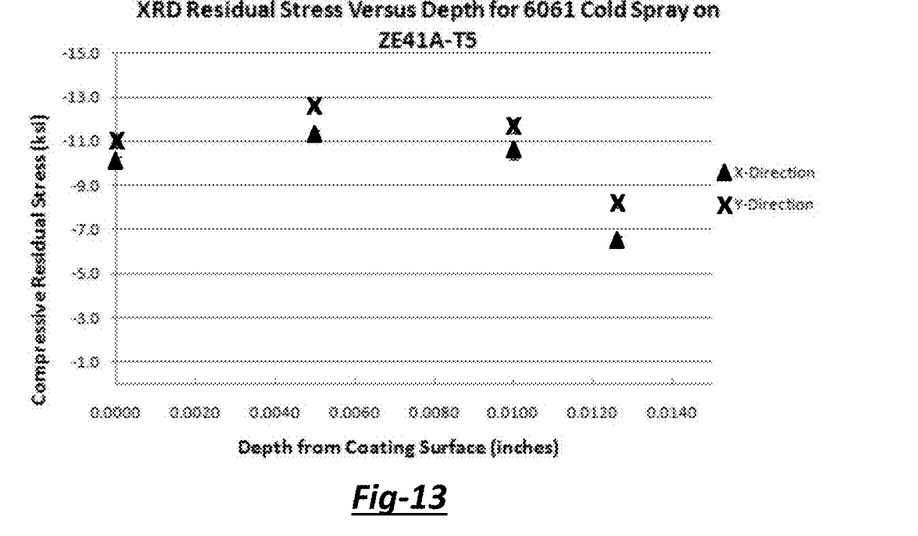
FIG. 13 is a graphical plot of compressive residual stress versus depth in a 6061 aluminum cold spray bead on a cast manganese alloy.

FIG. 13 shows residual stress profiles for the X direction and Y direction for a 0.0125 inch 6061 cold spray weld deposit on a ZE41A-T5 magnesium substrate. The sample was electropolished to four different depths for the measurements shown in the plot. In addition, the final measurement was taken in the magnesium substrate below the coating-substrate interface. All of the measurements showed that the cold spray 6061 aluminum weld was in a compressive stress state and that the ZE41A-T5 magnesium substrate was also in a compressive state just below the surface/interface. It is appreciated that this is an ideal scenario for such weld joints since compressive stresses impede crack growth. Furthermore, the compressive stress beneath the surface/interface is desirable since the corresponding tensile stresses are not located near the weld interface.

Figure 14:
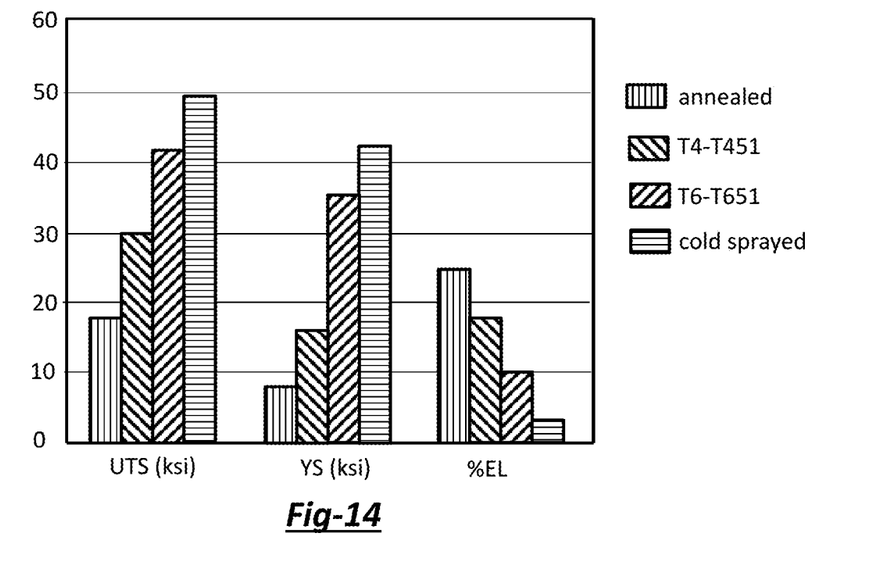
FIG. 14 is a graphical plot of tensile test results for cold spray beads of 6061 aluminum versus fully annealed 6061 aluminum wrought material, T4 annealed 6061 aluminum wrought material, and T6 annealed 6061 aluminum wrought material.

Tensile testing of 6061 aluminum cold spray weld material was also conducted with the results shown in FIG. 14. As shown by the data in FIG. 14, the cold spray 6061 aluminum has a very high strength in the as-cold sprayed condition (cold sprayed). In fact, the ultimate tensile strength and yield strength of the cold spray 6061 aluminum exceeds the properties of fully annealed, T4 and T6 tempered 6061 aluminum. Not being bound by theory, the primary strengthening mechanism for the 6061 cold spray aluminum is the work hardening that occurs during particle impact and consolidation in the sold state.

The elongation at failure was approximately 5%, however this elongation actually exceeds the elongation to failure of ZE41A-T5 cast magnesium and is also comparable with other cast magnesium alloys. It is appreciated that the ductility of the cold spray 6061 aluminum material can be increased with heat treating/annealing if desired.

It is appreciated that changes, modifications, and the like can be made by those skilled in the art and still fall within the scope of the present invention. As such, the scope of the invention is provided by the claims and all equivalents thereof.

What is claimed is:

1. A process for joining dissimilar materials comprising:
providing a first component made from a first material and a second component made from a second material, the first material and the second material being dissimilar materials; wherein the first material is magnesium or a magnesium alloy and the second material is aluminum or an aluminum alloy;
degassing the particles of the second material under high vacuum conditions of from $10^{-4}$ to $10^{-6}$ torr and heating the particles of the second material between 260 and 400° C.;
annealing particles of the second material in a reducing atmosphere prior to cold spraying the particles;
cold spraying the annealed particles of the second material to form a bead of the second material onto the first component wherein the bead has an adhesion strength to the first component and/or the second component that is greater than an ultimate tensile strength of the first component and/or the second component individually or in combination; and
joining the second component to the bead on the first component and forming a weldment of the first component and the second component at a temperature below the melting temperatures of both the first material and the second material.

2. The process of claim 1, wherein the particles are aluminum or an aluminum alloy.

3. The process of claim 2, wherein the particles are ellipsoid shaped.

4. The process of claim 1, wherein joining the second component to the bead on the first component is by fusion welding the bead and the second component together.

5. The process of claim 4, wherein the weldment is a butt joint between the first component and the second component.

6. The process of claim 4, wherein the weldment is a lap joint between the first component and the second component.

7. The process of claim 1, wherein joining the second component to the bead on the first component is by cold spraying another bead between the bead and the second component.

8. The process of claim 7, wherein the weldment is a butt joint between the first component and the second component.

9. The process of claim 7, wherein the weldment is a lap joint between the first component and the second component.

10. The process of claim 1, wherein joining the second component to the bead on the first component further comprises brazing the bead and the second component together.

11. The process of claim 10, wherein the weldment is a butt joint between the first component and the second component.

12. The process of claim 10, wherein the weldment is a lap joint between the first component and the second component.

13. The process of claim 1, wherein the bead between the first component and the second component is in a compressive stress state.

14. The process of claim 1, wherein the cold spraying is performed using a hand held and hand maneuvered nozzle.

15. The process of claim 1, wherein the cold spraying is performed using a robotic held and maneuvered nozzle.

16. The process of claim 1, wherein an interface between the bead and the first component is void of a heat affected zone.

17. The process of claim 1, wherein an interface between the bead and the first component is void of an intermetallic layer.

* * * * *